Patented Aug. 14, 1934

UNITED STATES PATENT OFFICE 1,969,904

BITUMINOUS ROAD MAKING COMPOSITION

Samuel S. Sadtler, Springfield Township, Montgomery County, Pa., assignor, by mesne assignments, to Charles J. Hepburn, Philadelphia, Pa.

No Drawing. Application November 6, 1931, Serial No. 573,527

8 Claims. (Cl. 106—31)

The object of my invention is to provide a novel and improved means for coating, with asphalt or other bituminous materials, damp stone constituting the aggregate of which the road composition is made.

A further object of my invention is to provide a bituminous composition which will form a firm and lasting bond with a mineral aggregate and particularly with a wet or damp or water-absorbent aggregate, such as some limestones, even when subsequently subjected to moist conditions.

A further object of my invention is to so treat a bituminous cement, such as residual asphalt, in such a way that the fluidity of the cement is increased upon the application of heat thereto, considerably over that which the same material would possess were it not treated in a manner hereinafter described and to provide the cement with ingredients which appear to increase the affinity of the cement to the stone, and to carry the cement into firm contact with the stone, notwithstanding the presence on the stone of a film of water which normally prevents such contact.

Further objects of my invention will appear in the specification and claims below.

In the construction of a roadway consisting primarily of a mineral aggregate, such as broken trap rock, limestone and the like, each individual piece of which is provided with a substantial coating of a bituminous cement of a thickness and consistency sufficient upon compaction to hold the pieces of stone fast in the roadway and wherein the spaces between contiguous pieces of aggregate are not completely filled with asphalt or with mineral matter, it is exceedingly important that the bond between the cementitious coating and the pieces of aggregate covered thereby be firm and tenacious. There is little trouble in securing such a bond with a dry hard stone which is non-absorbent of water, but when the aggregate is wet and its surface is covered with water, or when the stone is water absorbent and the surfaces are porous and the interstices are filled with water, difficulty is experienced in attaining a firm bond. When a wet or damp stone is so coated, and is exposed to the moisture of the atmosphere, such as heavy rains, or when it is laid in low damp soil, the bituminous coating tends to and actually does strip or frill and wash off or separate from the stone, leaving at first only parts of the aggregate bare or exposed, but once the stripping has started, the entire coating rapidly separates from the stone.

I have discovered that when certain stone aggregates are damp or water absorbent and wet, and there is no facile means for drying the same, that the drying of the aggregate may be dispensed with and a firm bond between a bituminous coating and the damp stone enclosed thereby may be attained, by giving the aggregate a preliminary treatment with a liquefier containing soap and an un-neutralized acid, the same forming the subject-matter of Letters Patent of the United States, No. 1,674,523, issued June 19, 1928.

But there are certain bituminous roads and certain methods of making bituminous roads, wherein it is impossible or inexpedient to subject the aggregate to a preliminary treatment with any liquefier, and there are certain bitumen-bound roads wherein the bituminous binder is of such a consistency that it requires no more flux, nor a liquefier.

Thus, for example, in making a bitumen-bound aggregate road of the penetration type, the stone or rock is laid in a course or courses on the foundation or sub-soil in an uncoated condition, and the bituminous binder is poured, sprayed or otherwise spread over the upper surface of the course of stone after placement, the cement being of such a consistency that it flows into and substantially fills the voids adjacent the surface of the roadway and seals the same. In constructing a road of this character, the stone is more frequently wet than dry and if the stone be water absorbent, it is substantially never free of its water content, unless it is dried, with the result that the bituminous cement thus poured over or applied to the upper surface of the wearing course cannot, and never does make a sufficiently firm contact with the aggregate, but is comparatively easily separated therefrom.

And in converting, for instance, a macadam road into one in which the stone is bound into the pavement with a bituminous cement, the stone of the macadam is often merely loosened in situ, the cement is applied to the surface in a hot fluid condition and the course so treated is subjected to compaction under a heavy roller. In practicing such a conversion process, it is impracticable to attempt to free the stone of water contained in it or present on the surfaces of the pieces of aggregate, before applying the cement thereto.

Further in making such roads as have been previously described, it is a common practice to select as the cement a bituminous composition which has the proper consistency, at atmospheric temperatures, to firmly hold the stone to which it is applied in position in the roadway and to attain the fluidity needed to distribute it over the stone by heating and melting it. In such construction work the use of a liquefier such as is used in connection with cold-laid pavements, may not be required at all for it is unnecessary to maintain the coated aggregate in a discrete form for transportation and placement, and, generally speaking, that is the main purpose and function of the liquefier, which is usually a volatile solvent of the cement, evaporating out of the cement after the paving material is laid with large areas exposed to the atmosphere.

Thus it is that there are many cases arising wherein it is impossible or impractical to use in the making of a bituminous bound course of pavement dried stone aggregate or to use or apply a special liquefier thereto and it is to the making of pavements under such conditions that the present invention is particularly directed.

I have discovered, after a rather extended period of experimentation and test, that I can provide a damp water-absorbent stone from which a bituminous coating normally easily separates and strips, by subjecting the cement itself to a preliminary treatment which greatly increases the bond formed between the so treated cement and such damp or wet stone and which also modifies the cement by making it more fluid when hot. The cement which I preferably employ is what is known in the trade as a residual asphalt of substantially 100 penetration. For certain purposes, however, I may use road oils, for instance, what is known in the trade as "Bunker C oil", or intermediate grades of asphaltic oils and cements ranging between semi-fluid condition at ordinary temperatures and the consistency of asphalts and that of 100 penetration. This cement is nearly or practically solid at atmospheric temperatures of from 60 to 75° F. and is freely fluent at temperatures of 250° F. and above.

To 1000 pounds of this Bunker oil, or to a residual asphalt of substantially 100 penetration and made fluid by heating, I add a small quantity of a fatty acid, such as oleic acid or a sulphonated fatty oil having a substantial content of free fatty acids, in quantity from 3 pounds to 30 pounds of the acid or of the sulphonated fatty oil, and I thoroughly stir and mix these ingredients together to homogeneity.

If the fatty acid is used, such as oleic acid, and while the mixture is still hot and with agitation, I add potassium hydroxide dissolved in a quantity of water which is substantially equal to the weight of the potassium hydroxide and also thoroughly stir the same into the mixture. The quantity of potassium hydroxide so added to the mixture is substantially one-tenth of the weight of the fatty acid.

This relatively small quantity of potassium hydroxide is merely sufficient to substantially half-neutralize the oleic acid previously added. It presumably combines with substantially one-half of the oleic acid to form potassium oleate, a water soluble soap, but the quantity is so small and the minute particles or globules are so widely distributed and diffused throughout the asphalt that its presence is not perceptible to the eye during the mixing process, that is to say, no milkiness or cloudy appearance in the asphalt is particularly observable. The diffusion of potassium oleate, when oleic acid is thus used in the process, is aided by the free acid and that for practical purposes may be said to be dissolved in the asphaltic oil or cement.

The quantities of oleic acid and of potassium hydroxide are so small that when the mixture is considered as a dispersion, it is a dispersion of the soap and of the acid in the oil or asphalt, the soap and the acid being in the same phase with respect to the oil. The small quantity of water added with the potassium hydroxide is practically absorbed by the asphalt but may, in part, be evaporated out from the heated asphalt.

When these ingredients are thus thoroughly mixed with the asphalt, the cement is complete. It may be allowed to cool until it is required for use or it may be stored for shipment in cans, drums, tanks or the like. It is fairly stable and may be stored.

The finished product may be used as a penetration cement for the making of roads in the manner above described, when warm and heated to a freely fluid consistency. By sprinkling or spraying or pouring the warm cement onto the surface of the stone road, it flows over and covers the stone with which it contacts. It adheres strongly to most limestone even when such stone contains from 0.5% to 1% of water and also to many other aggregates presenting damp or wet surfaces.

The water-soluble soap appears to act as a carrier of the oleic acid to and through any film of water on the surface of the stone. The water-soluble soap has what may be termed an affinity for the water on the surface of the stone and carries with it to the stone itself, the unneutralized acid which increases the affinity of the asphalt to the stone. The cement so formed is somewhat more fluid when heated than the same cement is before the treatment. It consequently penetrates more deeply into the stone on the road when applied and when cold holds the stones firmly in place. But the important characteristic of the composition is that it adheres firmly to damp aggregate and does not strip therefrom even when the pavement of which it forms a part is subjected to moisture in or from the atmosphere or the sub-grade.

After the cement has been applied to the stone to form the roadway, a heavy roller is preferably employed, as usual, to compact the course. In addition, however, to the steps above set out and described, I may and generally do scatter over the roadway preferably before or after the step of compaction, a thin sprinkling of hydrated lime, for instance, from 25 to 100 pounds, scattered over substantially 100 square yards of pavement. The lime functions to further toughen the asphalt cement and to render the cement more water resistant by breaking down whatever water-soluble soap there is in the asphalt and converting it into a water-insoluble soap. In place of hydrated lime I may use Portland cement, marble dust and the like, capable of making water insoluble soaps with the potassium oleate, and insoluble oleates with the free fatty acid.

While I have above described with particularity the way in which my invention may be practised, it is not to be construed as limited strictly to the use of potassium hydroxide, nor to the use of oleic acid, nor to the use of asphalt of exactly 100 penetration, nor to the use of stone containing no more than 1% of water, for in all these particulars the process may be somewhat varied within reasonable limits and by the use of generally accepted equivalents. Thus other alkalies, such as sodium hydroxide; and other fatty acids, such as palmitic acid or a mixture of fatty acids which react with the alkali to produce a water-soluble soap, or a sulphonated oleate or stearate, or an asphaltic oil, or cement of other hardness or penetration, or stones containing more than 1% of water, but preferably not more than 2.5% of water, may replace in whole or in part, respectively, the potassium hydroxide, the oleic acid, the 100 penetration asphalt and the stone containing from 0.5% to 1% of water without departing from the spirit and scope of this invention.

In place of the oleic acid or of the sulphonated oils, I may similarly use the alkaline salts of the naphthenic acids, having a free acid content or acid reaction, as for instance, the potassium salt of the naphthenic acids, and which are soluble in the bitumen for substantially the same objects and purposes.

The naphthenic said salts are generally somewhat more soluble in the asphalts than the acids and acid salts previously mentioned, but they also impart to the asphalt an increased affinity for the aggregate. The alkaline neutralizer or part neutralizer is soluble in the water present on or in the stone and similarly acts as a carrier to bring the asphalt cement containing the acid, through the water on the stone into close, firm, substantially non-stripping contact with the surfaces of the stone.

Having thus described my invention, what I claim and desire to protect by Letters Patent of the United States is:

1. The method of making a bituminous cement which firmly adheres to wet or damp mineral aggregate which consists in heating a relatively soft and plastic bituminous material until it is freely fluent, adding to the hot material and thoroughly mixing therewith a fatty acid (from 0.3% to 3%) and also adding and mixing therewith potassium hydroxide (from .03% to 0.3%) dissolved in an equal weight of water, the percentages of the ingredients so added to the bituminous material being by weight and based on the weight of said material.

2. The method of making a bituminous cement for application to a mineral aggregate having a water content of not substantially more than 2.5% by weight, which consists in heating a bitumen until it is freely fluent and thoroughly mixing therewith a fatty acid in quantity from 0.3% to 3% of the weight of the bitumen and enough of an alkali to substantially half-neutrize the said fatty acid, the unneutralized acid and the water soluble-soap formed by the reaction between the said acid and the said alkali being uniformly distributed throughout the bitumen.

3. The method of making a bituminous cement for application to a mineral aggregate having a water content of not substantially more than 2.5% by weight, which consists in heating an asphalt having a penetration of substantially 100 to a point at which it is freely fluent, thoroughly mixing therewith oleic acid in quantity from .3% to 3% of the weight of the asphalt, and potassium hydroxide in quantity substantially one-tenth of the weight of the fatty acid, the unneutralized fatty acid and the water-soluble soap, formed by the reaction between the said acid and the said potassium hydroxide, being uniformly distributed throughout said asphalt.

4. The method of making a bituminous cement for application to mineral aggregate having a water content of not substantially more than 2.5%, which consists in heating an asphalt having a penetration of substantially 100 to a point at which it is freely fluent, thoroughly mixing therewith oleic acid in quantity from 0.3% to 3% of the weight of the asphalt, then adding thereto and thoroughly mixing therewith potassium hydroxide in quantity substantially one-tenth of the weight of the fatty acid, said potassium hydroxide being dissolved in a quantity of water substantially equal by weight to the weight of the potassium hydroxide, the unneutralized fatty acid and the water-soluble soap formed by the reaction between said acid and the said potassium hydroxide being uniformly distributed throughout said asphalt.

5. The method of making a bituminous cement particularly adapted for application to a damp mineral aggregate, which consists in adding and thoroughly mixing into a bitumen, in a freely fluid condition, a relatively small quantity of a substance having an acid reaction and which will react with an alkali to form a soap, adding to the mixture, with agitation, a small quantity of an alkaline substance to substantially half-neutralize the said acidic substance and to form therewith a water-soluble soap, the unneutralized acid and the soap, formed by the reaction between said acid and said alkaline substance, being uniformly distributed in minute particles throughout the bitumen.

6. The method of making a bituminous cement particularly adapted for application to a damp mineral aggregate, which consists in adding and thoroughly mixing into a bitumen, in a freely fluid condition, a relatively small quantity of oleic acid, adding to the mixture, with agitation, a small quantity of an alkaline substance to substantially half-neutralize said acid and to form therewith a water-soluble soap, the unneutralized acid and the soap, formed by the reaction between said acid and said alkaline substance, being uniformly distributed in minute particles throughout the bitumen.

7. The method of making a bituminous cement particularly adapted for application to a damp mineral aggregate, which consists in adding and thoroughly mixing into a bitumen, in a freely fluid condition, a relatively small quantity of a substance comprising sulphonated fatty oil having an acid reaction and which will react with an alkali to form a soap, adding to the mixture, with agitation, a small quantity of an alkaline substance to substantially half-neutralize the acid of said sulphonated oil and to form therewith a water-soluble soap, the neutralized acid and the soap, formed by the reaction between said acid and said alkaline substance being uniformly distributed in minute particles throughout the bitumen.

8. The method of making a bituminous cement particularly adapted for application to a damp mineral aggregate, which consists in adding and thoroughly mixing into a bitumen which is in a freely fluid condition, a relatively small quantity of a substance comprising salts of naphthenic acids having an acid reaction and which are soluble in the bitumen, adding to the mixture with agitation a small quantity of an alkaline substance sufficient to partly neutralize the acid of said salts, the unneutralized acid and the compound, formed by the reaction between said acid and said alkaline substance being uniformly distributed in minute particles throughout the bitumen.

SAMUEL S. SADTLER.